F. A. WATERS.
PEANUT PLANTER.
APPLICATION FILED JUNE 24, 1916.
1,230,350.
Patented June 19, 1917.
2 SHEETS—SHEET 1.
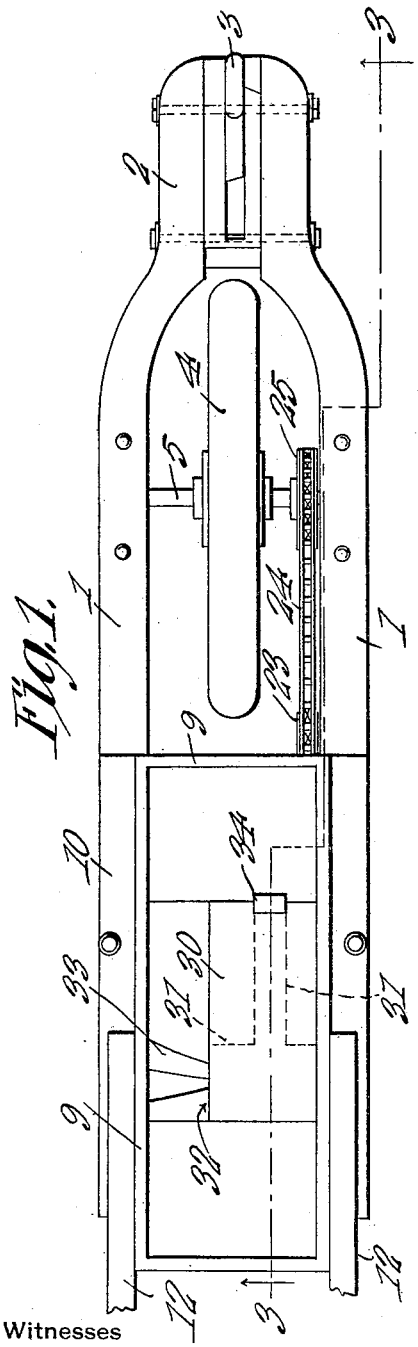
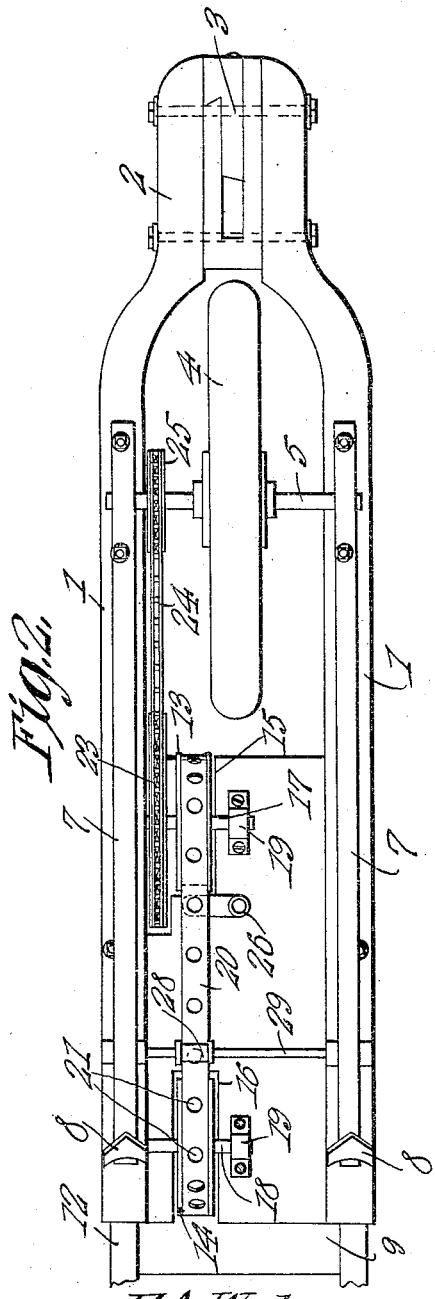
Witnesses
F. A. Waters,
Inventor
by
Attorneys

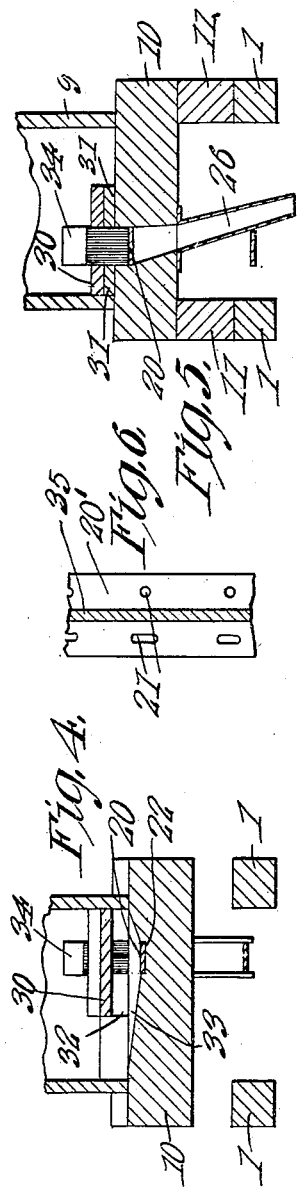
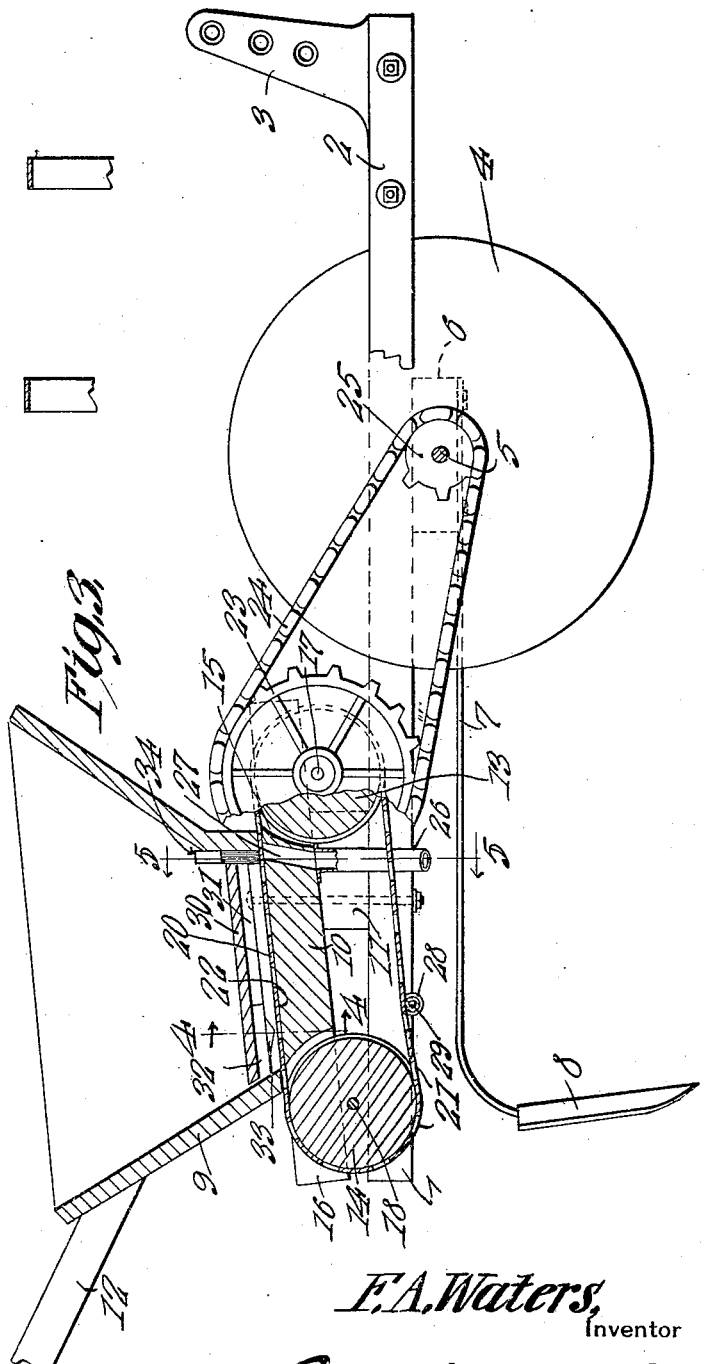

UNITED STATES PATENT OFFICE.

FERNIE A. WATERS, OF GRACEVILLE, FLORIDA.

PEANUT-PLANTER.

1,230,350.  Specification of Letters Patent.  Patented June 19, 1917.

Application filed June 24, 1916. Serial No. 105,715.

*To all whom it may concern:*

Be it known that I, FERNIE A. WATERS, a citizen of the United States, residing at Graceville, in the county of Jackson and State of Florida, have invented a new and useful Peanut-Planter, of which the following is a specification.

The present invention appertains to planters, and aims to provide a novel and improved machine for planting peanuts and other similar seed.

It is the object of the invention to provide a peanut planter having novel means for effecting the proper delivery of the seed peanuts.

It is also the object of the invention to provide a planter of inexpensive and simple construction, which is particularly efficacious for planting seed peanuts and the like.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:—

Figure 1 is a top plan view of the planter.

Fig. 2 is a bottom plan view thereof.

Fig. 3 is a longitudinal section taken on the line 3—3 of Fig. 1.

Figs. 4 and 5 are cross sectional details taken on the lines 4—4 and 5—5, respectively, of Fig. 3.

Fig. 6 is a detail view illustrating a modification.

In carrying out the invention, the frame of the planter embodies a pair of longitudinal side beams 1 having their forward ends converging toward and secured to one another, as at 2, and having clamped therebetween a clevis 3 to which the draft animal or animals can be hitched. A ground wheel 4 is disposed between the beams 1 adjacent the forward ends thereof, and is secured upon an axle or shaft 5 journaled in bearings 6 secured to and depending from the beams 1. Secured to the bearings 6 are rearwardly projecting resilient bars 7 equipped at their rear free ends with soil working blades or shovels 8 for loosening the soil and covering the peanuts after they are dropped.

A peanut hopper 9 is mounted upon the rear portion of the frame, being secured upon a forwardly inclined bottom plate 10 having its forward end at a higher level than its rear end. Said bottom plate 10 is bolted or otherwise secured upon blocks 11 which are in turn secured upon the beams 1, and the handles 12 are secured to the sides of the hopper 9. The bottom plate 10 projects forwardly and rearwardly from the hopper.

The peanut discharging or delivering mechanism embodies pulley wheels 13 and 14 disposed in recesses 15 and 16, respectively, with which the forward and rear ends of the plate 10 are provided beyond the ends of the hopper, said pulley wheels being mounted upon transverse axles 17 and 18, respectively, journaled in bearings 19 secured to the bottom of the plate 10 at opposite sides of the recesses or slots 15—16. An endless belt 20 which may be constructed of leather, rubber, chain links or the like, is trained around the wheels 13 and 14 and is provided with apertures 21. The upper run of the belt 20 works longitudinally within a longitudinal channel 22 with which the upper surface of the plate 10 is provided, whereby said upper run of the belt travels through the lower portion of the hopper adjacent one side thereof. In order to operate the belt 20 at the proper speed, a sprocket wheel 23 is secured upon the axle 17 and is connected by an endless sprocket chain 24 with a sprocket wheel 25 of smaller diameter secured upon the axle or shaft 5, whereby when the wheel 4 is rotated due to the forward movement of the machine, this motion will be transmitted to the belt 20, whereby the upper run thereof moves forwardly.

Attached to and depending from the plate 10 adjacent the forward end thereof and immediately in rear of the pulley wheel 13 is a boot or spout 26 for delivering the peanuts to the ground in the furrow made by the wheel 4. The plate 10 has an opening 27 extending upwardly from the spout 26 at the forward end of the hopper and with which the apertures 21 register in succession, in order that the peanuts will drop from said apertures down the opening 27 and spout 26.

The belt 20 is held taut by means of an idler pulley 28 bearing upwardly against the lower run of the belt and carried by a transverse axle 29 secured to the beams 1.

In order to provide for the proper and restricted movement of the peanuts onto the belt, a longitudinal board or plate 30 is provided in the lower portion of the hopper adjacent to but spaced slightly above the bottom plate 10, said plate 30 having one edge attached to or bearing against one side of the hopper, while the opposite edge of the plate 30 is spaced from the opposite side of the hopper, to permit the peanuts to drop and then roll under the plate 30. The plate 30 extends to the ends of the hopper, and is disposed above the groove 22 and upper run of the belt which are located adjacent the same side of the hopper as said plate 30. The plate 30 is secured upon longitudinal cleats 31 disposed upon the plate 10 at opposite sides of and adjacent to the groove 22, and said cleats 31 serve to support and space the plate 30 from the bottom plate 10. The cleats 31 extend to the forward end of the hopper but their rear ends are spaced from the rear end of the hopper, to provide an opening 32 through which the peanuts can roll from the bottom plate 10 at one side of the plate 30 under the rear end of the plate 30. The plate 10 is provided with a trough 33 adjacent the rear end of the hopper and sloping to the belt 20, whereby the peanuts will readily roll onto the belt through the opening 32 past which the trough 33 extends. The opening 27 extends to the groove 22 and the belt 20 passes over said opening. A brush 34 has its back secured to the forward end of the hopper at the forward end of the plate 30 and its bristles project downwardly and contact with the upper run of the belt above or immediately in rear of the opening 27. Said brush serves to brush back any peanuts resting upon the belt, and therefore prevents the excessive discharge of peanuts. The brush 34 also assists in pushing those peanuts downwardly through the opening 27 which are within the apertures 21.

In operation, supposing the hopper 9 to be filled with peanuts or other seed of similar nature, when the machine is pulled along the ground, the wheel 4 will be rotated, and will therefore operate the belt 20. The peanuts roll along the trough 33 through the opening 32 onto the belt and fall within the apertures 21, so as to be carried forwardly with the belt under the brush 34 and thence over the opening 27 through which the peanuts drop into and out of the spout 26. The peanuts are thus discharged intermittently at the proper intervals. The plate 30 supports most of the peanuts in the hopper and the peanuts gravitate downwardly between the plate 30 and the opposite side of the hopper to the trough 33 and opening 32. This prevents the excessive flow of peanuts onto the belt. The bottom plate 10 being inclined facilitates the flow of peanuts to the opening 32, as will be apparent.

As illustrated in Fig. 6, the belt 20' can be provided with two sets of apertures 21 on opposite sides of a partition 35, whereby two different kinds of seed can be planted at the same time.

Having thus described the invention, what is claimed as new is:

1. A planter embodying a frame, a ground wheel therefor, a hopper having a bottom plate mounted upon the frame, a pair of pulley wheels, an endless belt trained around said pulley wheels and having apertures, an operative connection between one pulley wheel and the ground wheel, the bottom plate having an upper longitudinal groove in which the upper run of the belt is movable, said bottom plate having an opening over which the apertures of the belt move in succession, a spout secured to and depending from the bottom plate and extending from said opening thereof, and means within the lower portion of the hopper above the belt for restricting the flow of seed onto the belt.

2. A planter embodying a hopper, a bottom plate therefor having an upper longitudinal groove, a belt movable in said groove and having apertures, said bottom plate having an opening adjacent one end of the hopper from which the seed drop from said apertures, a brush carried by the hopper and having downwardly projecting bristles contacting with the belt adjacent said opening, and a plate supported above the bottom plate and belt to restrict the flow of seed from the hopper onto the belt at that end of the hopper remote from the brush.

3. A planter embodying a hopper, a bottom plate therefor having an upper longitudinal groove and an opening extending from said groove adjacent one end of the hopper, an endless belt movable in said groove and having apertures adapted to register in succession with said opening, said groove and belt being located adjacent one side of the hopper, a plate within the lower portion of the hopper adjacent to and spaced from the bottom plate, the second mentioned plate extending to said side and the ends of the hopper and being spaced from the opposite side of the hopper, the bottom plate being inclined, said opening of the bottom plate being located near the upper end thereof, a brush carried by the hopper and having downwardly projecting bristles contacting with the belt adjacent said opening, and cleats upon the bottom plate adjacent to and at the opposite sides of said groove, the second mentioned plate being supported by said cleats, the cleats extending from said end of the hopper and terminating short of the other end to provide an opening between the plates adjacent the last mentioned end of the hopper, the bottom plate having a trough extending past the last mentioned opening in the belt to facilitate the flow of seed onto the belt.

4. A planter embodying a hopper having a bottom plate, a belt movable over said plate and having apertures, a brush carried by the hopper at one wall thereof having downwardly projecting bristles contacting with the belt where it passes out of the hopper, and means within the lower portion of the hopper above the belt for restricting the flow of seed onto the belt at a point remote from the brush.

In testimony that I claim the foregoing as my own, I have hereto affixed my signature in the presence of two witnesses.

FERNIE A. WATERS.

Witnesses:
J. W. KIRKLAND,
R. L. McCRARY.

Copies of this patent may be obtained for five cents each, by addressing the "Commissioner of Patents, Washington, D. C."